(12) United States Patent
Rubin et al.

(10) Patent No.: US 8,616,526 B2
(45) Date of Patent: Dec. 31, 2013

(54) INSERTION DEVICE FOR A CABLE IN AN EXISTING PIPE NETWORK

(75) Inventors: Marc Rubin, Zauggenried (CH); Thomas Seiler, Bern (CH); Ulrich Herrmann, Stettlen (CH)

(73) Assignee: Swisscom AG, Bern (CH)

( * ) Notice: Subject to any disclaimer, the term of this patent is extended or adjusted under 35 U.S.C. 154(b) by 230 days.

(21) Appl. No.: 13/130,241

(22) PCT Filed: Dec. 2, 2009

(86) PCT No.: PCT/EP2009/066178
§ 371 (c)(1), (2), (4) Date: May 19, 2011

(87) PCT Pub. No.: WO2010/063738
PCT Pub. Date: Jul. 10, 2010

(65) Prior Publication Data
US 2011/0227010 A1   Sep. 22, 2011

(30) Foreign Application Priority Data

Dec. 2, 2008 (EP) ..................................... 08170485

(51) Int. Cl.
*H02G 1/08* (2006.01)
(52) U.S. Cl.
USPC ... 254/134.3 FT; 254/134.3 R; 254/134.3 SC
(58) Field of Classification Search
USPC ...................................... 15/104.05–104.067; 254/134.3 R–134.3 SC; 385/136, 138; 600/139–152; 604/528, 533, 95.04
See application file for complete search history.

(56) References Cited

U.S. PATENT DOCUMENTS

| | | | | |
|---|---|---|---|---|
| 4,684,161 A | * | 8/1987 | Egner et al. | 294/219 |
| 4,692,957 A | * | 9/1987 | Kovacs | 15/104.33 |
| 4,842,207 A | * | 6/1989 | Kinnan | 242/390.9 |
| 5,080,020 A | * | 1/1992 | Negishi | 104/138.2 |

(Continued)

FOREIGN PATENT DOCUMENTS

| | | | |
|---|---|---|---|
| DE | 20 2007 017 822 | | 4/2008 |
| EP | 2073058 A1 | * | 6/2009 |

(Continued)

*Primary Examiner* — Lee D Wilson
*Assistant Examiner* — Tyrone V Hall, Jr.
(74) *Attorney, Agent, or Firm* — McAndrews, Held & Malloy

(57) ABSTRACT

An insertion device for a cable in an existing pipe network includes a longitudinally stable flexible element that can be inserted into a pipe region of the pipe network, and on which a head part can be placed. The head part can be diverted to pass through regions of bends of the pipe. Placed on the flexible element is a coupling part to which coupling part the cable to be pulled can be coupled. The head part includes a base body having an elongated shape, which can be led from a stretched position into a bent position. The base body includes guide elements by which at least one pulling element is guided that is spaced apart from the bending axis of the base body. One end of the pulling element is held at one end region of the base body, whereas the other end is held at a drivable linear drive that is attached at the other end region of the base body. Disposed at the end region, remote from the flexible element, of the head part are a light source and a camera. With this device, bends, elbows, and branches in an existing pipe network can be passed through in the desired direction without a problem.

87 Claims, 9 Drawing Sheets

(56) References Cited

U.S. PATENT DOCUMENTS

| | | | |
|---|---|---|---|
| 5,179,934 A * | 1/1993 | Nagayoshi et al. | 600/152 |
| 5,448,989 A * | 9/1995 | Heckele | 600/142 |
| 5,549,542 A * | 8/1996 | Kovalcheck | 600/146 |
| 5,681,263 A * | 10/1997 | Flesch | 600/141 |
| 5,687,954 A * | 11/1997 | Schroeder | 254/134.3 FT |
| 5,820,249 A * | 10/1998 | Walsten et al. | 362/191 |
| 5,916,147 A * | 6/1999 | Boury | 600/146 |
| 6,349,460 B1 * | 2/2002 | Eslambolchi et al. | 29/407.04 |
| 6,681,795 B2 * | 1/2004 | Beals et al. | 137/318 |
| 2006/0056782 A1 * | 3/2006 | Elkins et al. | 385/100 |
| 2011/0227012 A1 * | 9/2011 | Wang et al. | 254/134.5 |

FOREIGN PATENT DOCUMENTS

| | | |
|---|---|---|
| GB | 2 172 079 | 9/1986 |
| JP | 9 19018 | 1/1997 |
| JP | 09019018 A * | 1/1997 |

\* cited by examiner

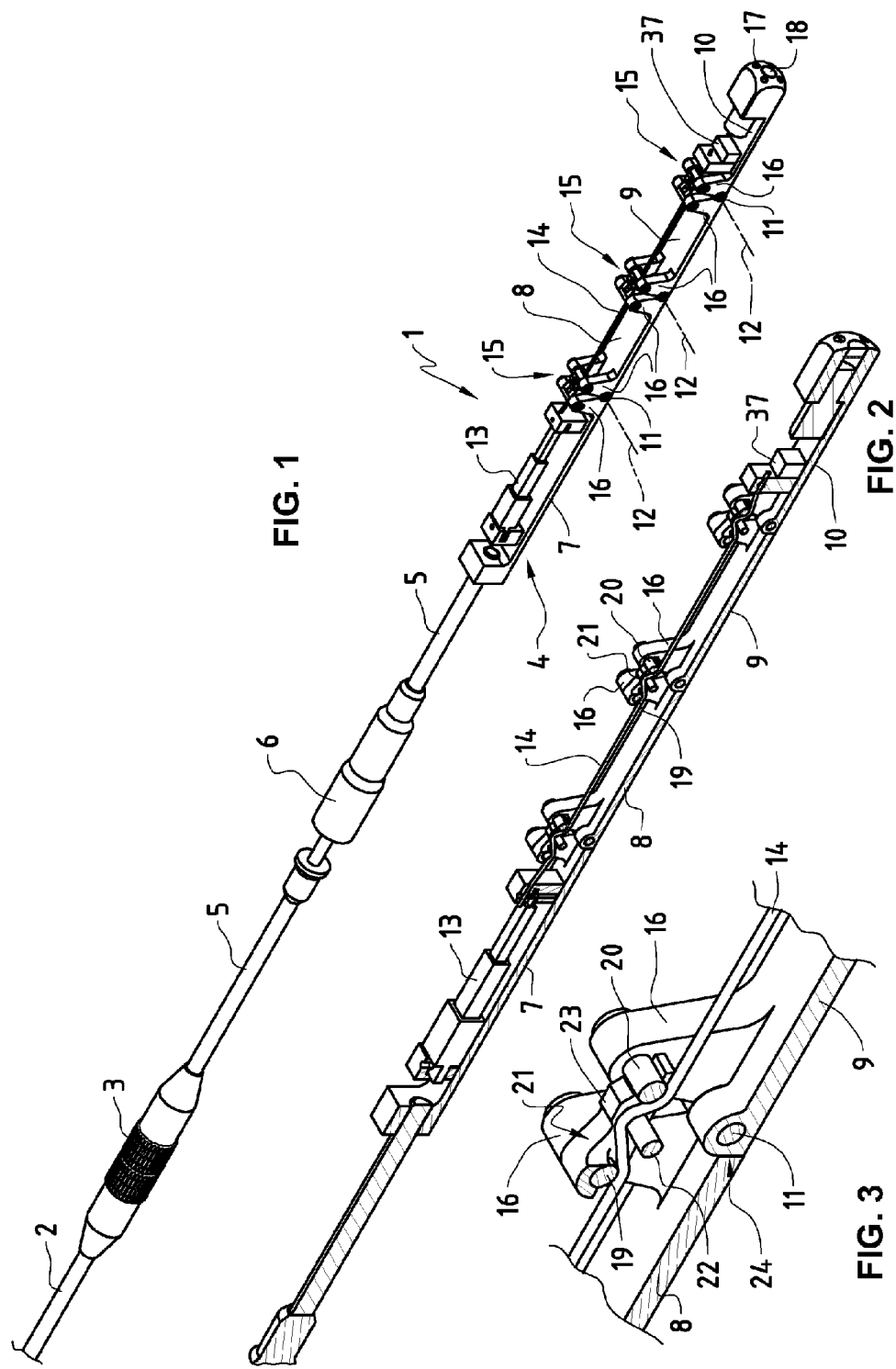

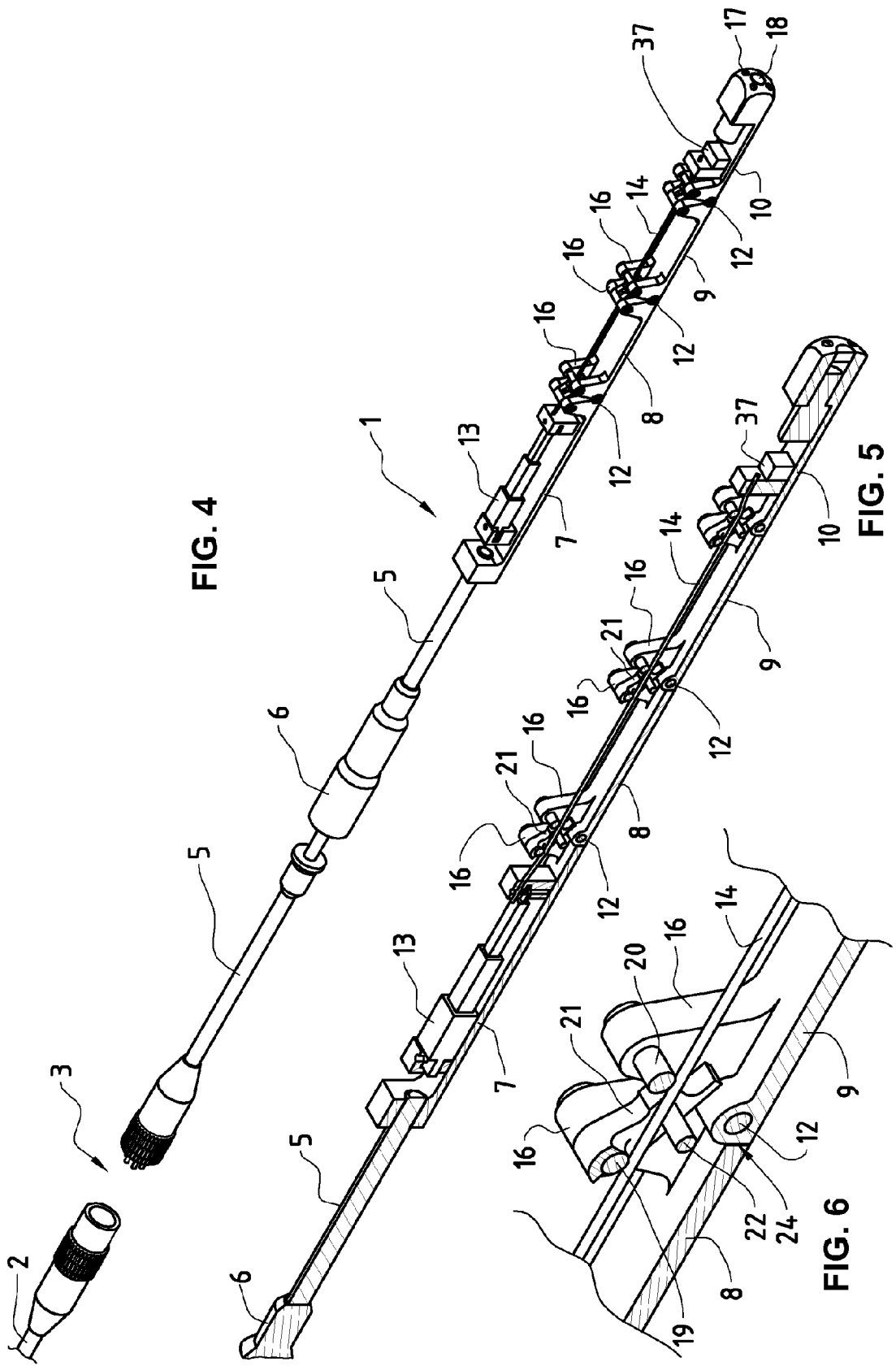

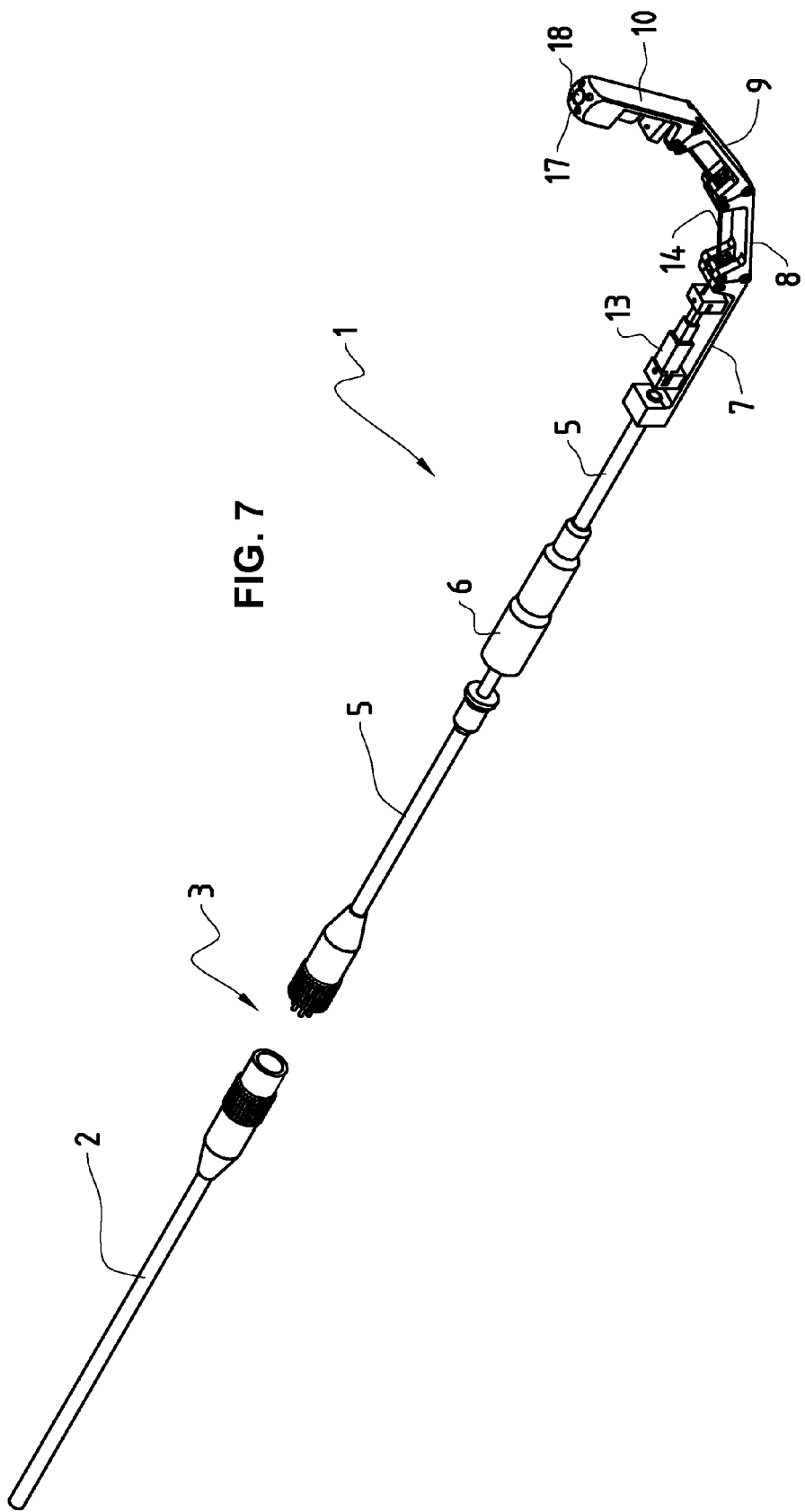

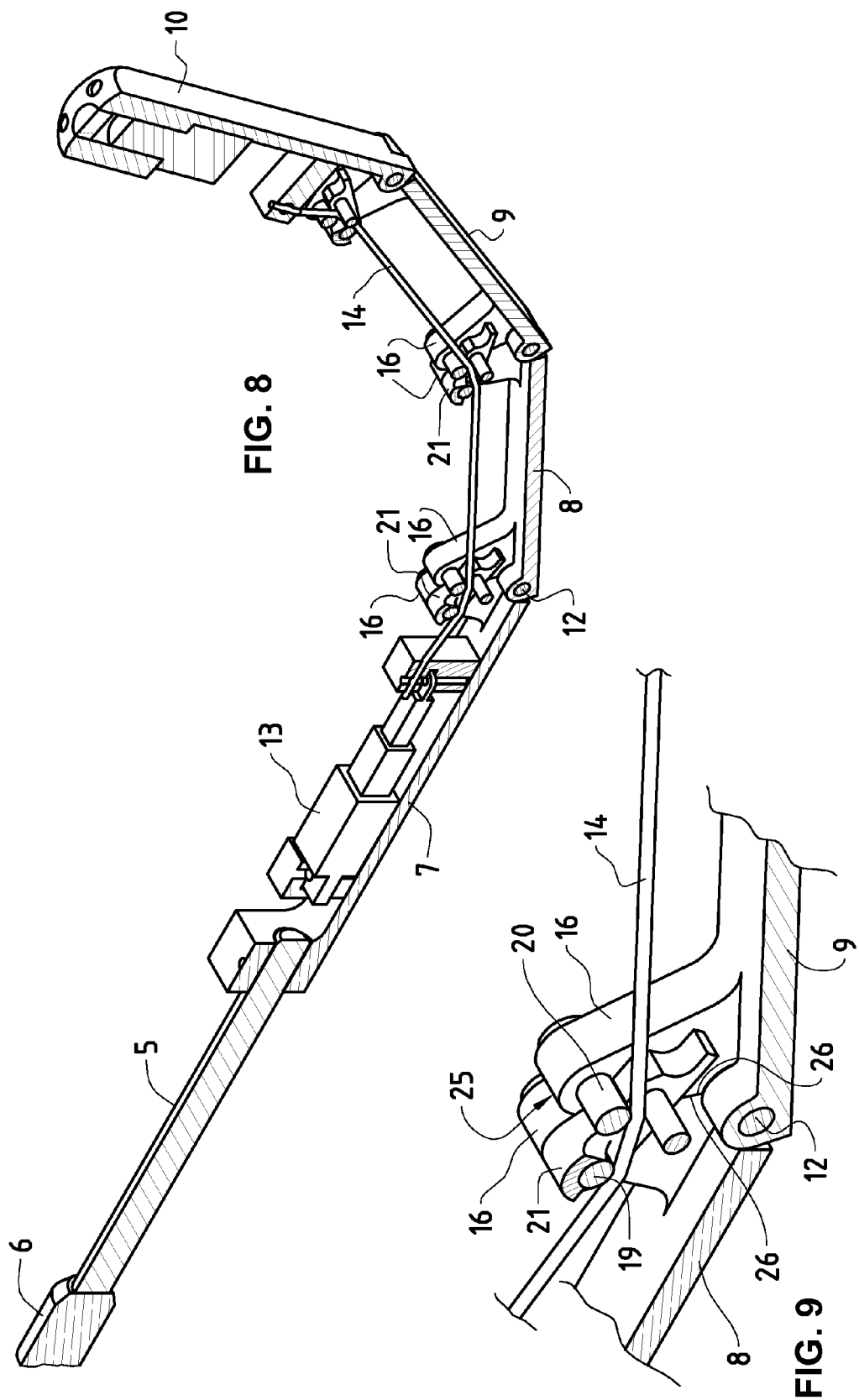

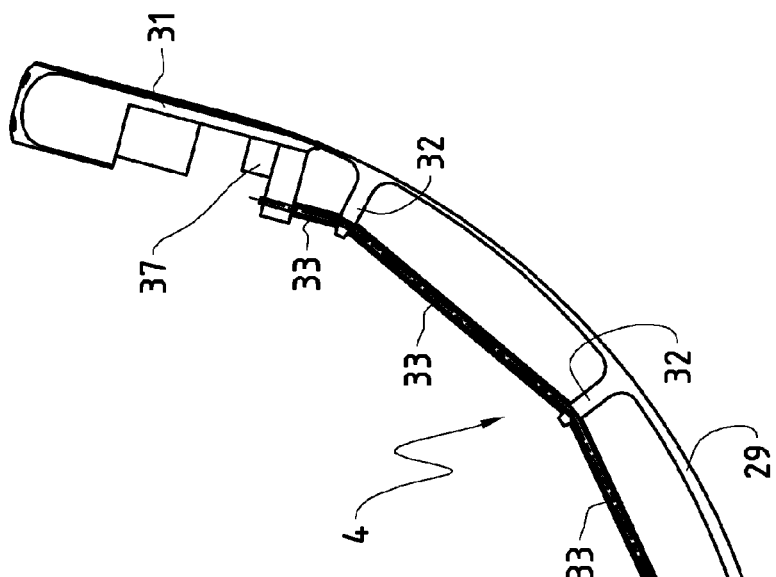
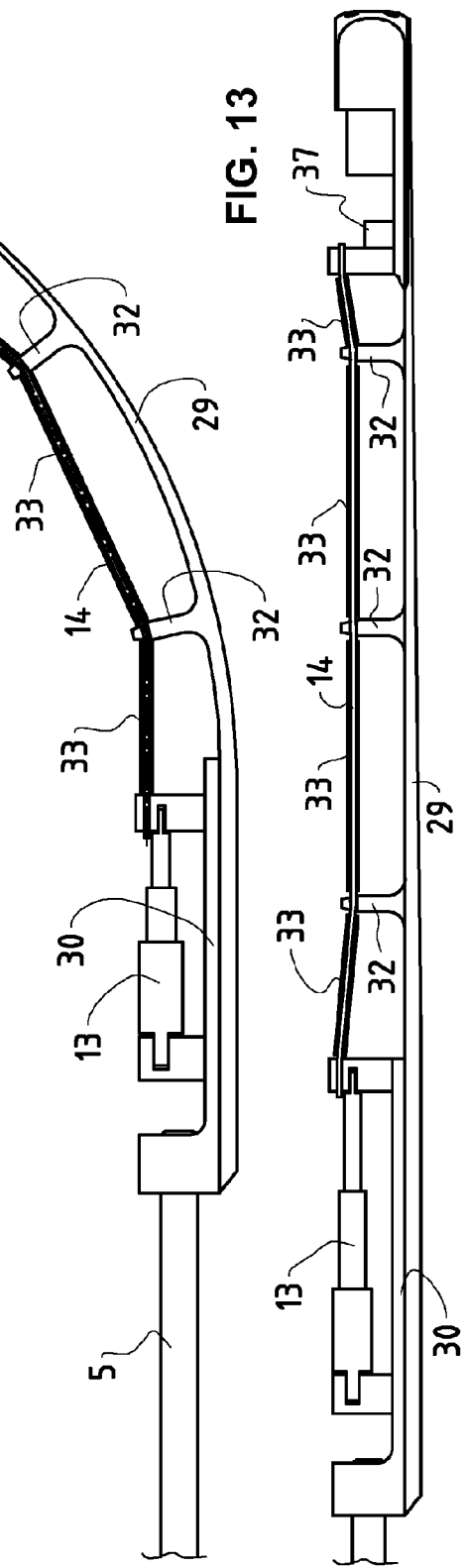
FIG. 12
FIG. 13

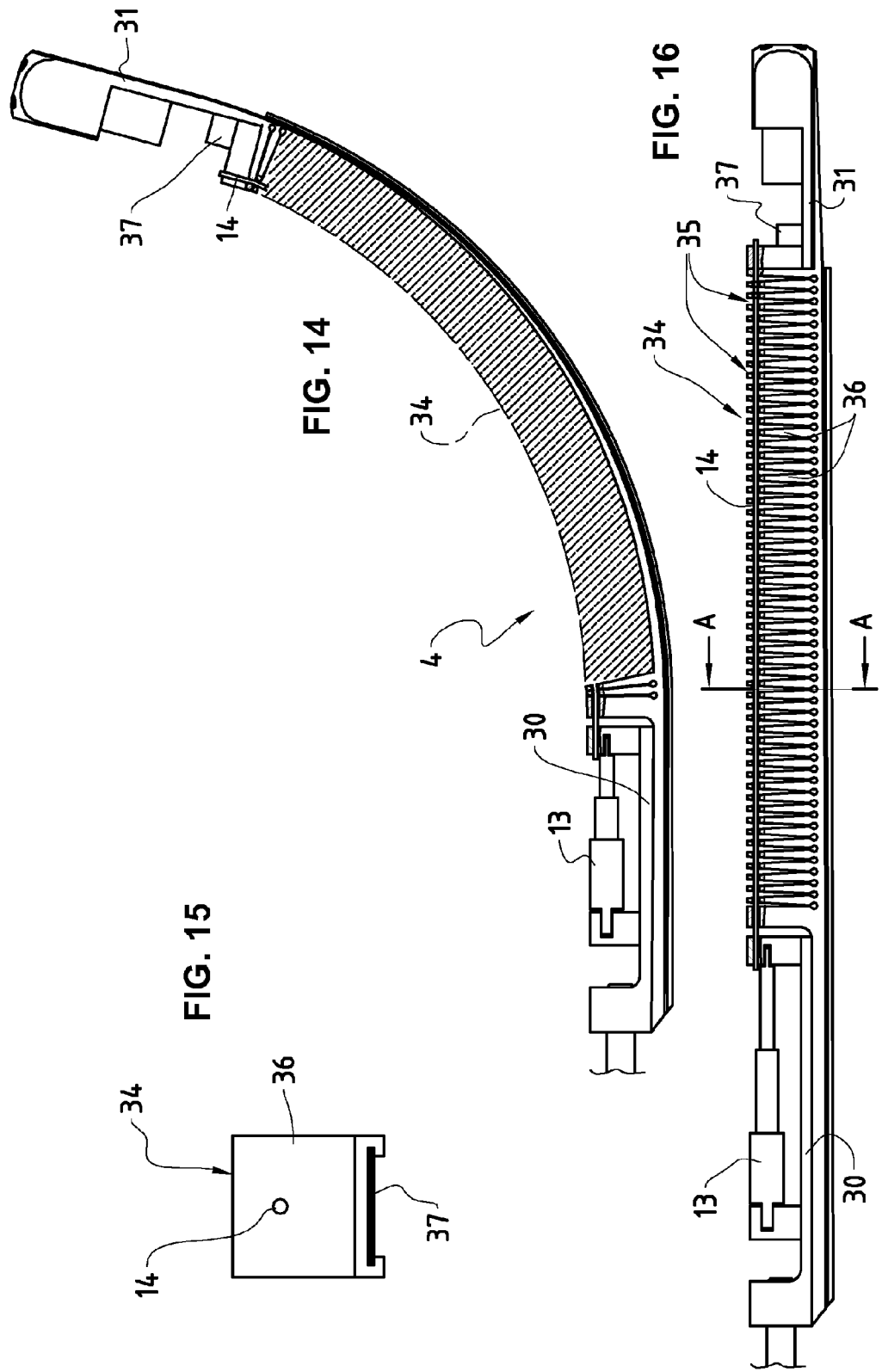

INSERTION DEVICE FOR A CABLE IN AN EXISTING PIPE NETWORK

The present invention relates to an insertion device for a cable in an existing pipe network, comprising a longitudinally stable, flexible element, which is able to be inserted into a pipe region of the pipe network, a head part able to be placed on the flexible element, which head part is capable of being diverted for passing through areas of bends of the pipe, a coupling part, which is able to be placed on the flexible element and to which the cable to be pulled in is able to be coupled.

Insertion devices of this kind for cable in existing pipe networks are known in diverse designs. For this purpose, particularly a longitudinally stable, flexible element (which is also called in German a "Rute" or rod) is inserted in a shaft or manhole, for example, into a pipe laid under the ground, in which pipe cable can already be situated. A longitudinally stable, flexible element of this kind can be inserted into the pipe over a certain distance, for which purpose pushing devices are used in a known way, until the next shaft or manhole is reached, or until a T-junction is reached, for example. At such a T-junction it can be necessary for this T-junction to be exposed, which entails corresponding excavation work that is time-consuming and costly. The cable that is supposed to be pulled through the corresponding pipe can be coupled to the longitudinally stable, flexible element inserted in this pipe; by pulling back via the pushing device of the longitudinally stable, flexible element, the cable is pulled into the pipe.

Such a longitudinally stable, flexible element is suitable only for straight pipe regions or pipe regions having bends with larger radii. In particular when insertion is supposed to be carried out in an elbow region, bends (elbows) of the pipe or T-junctions cannot be passed through with this longitudinally stable, flexible element, which results in the above-mentioned greater labor costs.

Insertion devices with a longitudinally stable, flexible element are also known on whose push-in end a rod, capable of being diverted, is placed, whose leading end is provided with a spherical thickening, for example. Narrower bends in the pipe can be passed through with such a longitudinally stable, flexible element. It is even possible to pass through elbows of the respective pipe. However, it is not possible at a T-junction to select the desired branch, it being necessary here to expose this T-junction.

The object of the present invention thus consists in designing an insertion device for a cable in an existing pipe network in such a way that the longitudinally stable, flexible element to be pushed in has a head part that is capable of being diverted in a controlled way in the desired direction, so that bends (elbows) and in particular T-junctions are able to be passed through by the longitudinally stable, flexible element pushable into the pipe network without any problem, and in a way selecting the correct branch.

The object is achieved according to the invention in that the head part comprises a base body having an elongated shape, which base body is able to be led from a stretched position into a bent position, which base body is equipped with guide elements, by means of which at least one pulling element is guided that is spaced apart from the bending axis of the base body, which at least one pulling element is held by the one end on an end region of the base body and by the other end on a drivable linear drive disposed on the other end region of the base body, and in that disposed on the end region, remote from the flexible element, of the head part is a light source and a camera.

Through this design of the head part placeable on the flexible element, bends (elbows) and T-junctions as well as intersections can be passed through without any problem. Via the camera the operator receives on his screen a picture of the pipe region illuminated by the light source. When a bend (elbow) is reached, the head part is diverted in the correct direction through actuation of the corresponding linear drive. The thus diverted head part arrives in the corresponding elbow pipe region. The linear drive is released. The head part for the longitudinally stable, flexible element moves into the selected pipe part. Through this design, the longitudinally stable, flexible element allows itself to be pushed through the corresponding pipe region until it arrives again in a shaft or manhole. The cable to be pulled in can be coupled to the longitudinally stable, flexible element in this reached shaft or manhole. After the head part has been decoupled therefrom, the cable can be pulled into the desired pipe region through the pulling back of the longitudinally stable, flexible element, without the corresponding pipe section having to be exposed, if necessary, in the case of branches or bends (elbows).

Preferably the divertable base body is designed in such a way that it is capable of being diverted in a plane, and in that disposed between head part and longitudinally stable, flexible element is a turning mechanism. Only at most two linear drives and two pulling elements would thereby be necessary, which would be installed on the base body symmetrically with respect to the bending axis; in order to make every change of direction possible, the turning mechanism is provided, with which the divertable base body can be turned into the correct position.

Preferably the divertable base body is provided with spring means, by means of which the divertable base body is pushable into the stretched position. After the diversion of the base body, for change of direction, the actuated linear drive can thereby be driven back. The diverted base body automatically assumes again the stretched position, which facilitates the further pushing into the desired pipe.

Another advantageous embodiment of the invention consists in that only one pulling element is provided, whereby the base body is divertable out of the stretched position on one side only, and in that the head part is turnable via the turning drive by at least ±180°. This results in a simple design for the divertable base body.

The completely diverted position of the divertable base body is preferably limited by stop elements, whereby too great a diversion can be avoided in order to guide the longitudinally stable, flexible element (rod) subsequently around the bend.

Preferably the base body is made up of individual members connected together in an articulated way, whereby a stable construction is achievable for this head part. Another advantageous embodiment of the invention consists in that the members are each provided with a further articulation which is disposed such that the members are capable of being diverted transversely to said plane. During moving into the conduit or wire tube, the base body can thereby adapt itself to smaller curves that do not lie in the plane of the controlled diversion of the members.

Preferably, the further articulation is provided with an elastic element which pushes the further articulation into the stretched position, whereby the starting position is reached again in each case.

The guide elements are formed by projections provided on both end regions of the respective member. The facing surfaces directed toward the projections of the adjacent member form moreover the stop elements, whereby achieved is a simple design of the respective members for fulfilling the required functions.

A further advantageous embodiment of the invention consists in that the members forming the base body are blockable in the stretched position by locking pieces, which are pushable via spring force into the locking position. A high degree of stability of the head part is thereby achieved when pushing into straight regions of the respective pipe.

A simple unlocking of the locking pieces and diversion of the head part is thereby achieved in that each locking piece is provided with a bolt situated transversely to the pulling element, about which the pulling element is guided, and which bolt is disposed in such a way that, upon pulling on the pulling element and reaching of the stretched position of the pulling element, the locking pieces are released, and upon further pulling on the pulling element the members divert. In addition, an optimal functioning of the head part is thereby achieved.

The base body can also be composed of a leaf spring, on which the guide elements are installed in a way spaced apart from one another, which results in an especially simple design of the head part. Preferably tubular sleeves can be put on the pulling element between the guide elements, which sleeves serve as stop elements, likewise resulting in a simple design.

The base body can however also be composed of a longitudinal section made up of elastic material, in which wedge-shaped cavities are provided on one side, and the crosspieces left standing serve as guide elements for the pulling element and as stop elements. This too results in a simple design of the head part.

Preferably the linear drive and the turning mechanism are driven electrically. Their supply cables and the cables for the light source and the camera are led through the head part and the longitudinally stable, flexible element, which is achievable in a simple way.

Preferably the head part with the turning mechanism is connectible to the longitudinally stable, flexible element via a releasable coupling connection and plug connection, whereby the head part can be separated from the longitudinally stable, flexible element and connected again in a simple way, and whereby the coupling connection can also be used at the same time for the coupling part, to which the cable to be pulled in is attachable.

Preferably disposed in the base body is a gravitational sensor, with which the position of the base body with respect to gravity is able to be determined. The respective position can be shown to the operator. The determination of the position can also be used to adjust the position of the base body with respect to gravity via the turning mechanism.

Embodiments of the insertion device according to the invention will be explained more closely in the following, by way of example, with reference to the attached drawings, in which:

FIG. 1 shows in a three-dimensional representation a first embodiment of the head part, which is placed on the longitudinally stable, flexible element, in the stretched position;

FIG. 2 shows a three-dimensional view in section of the head part according to FIG. 1;

FIG. 3 shows an enlarged sectional representation of two members, connected together, of the head part of the embodiment according to FIG. 1 and FIG. 2;

FIG. 4 shows the head part of the first embodiment in the state released from the longitudinally stable, flexible element;

FIG. 5 shows a three-dimensional sectional representation of the head part according to the preceding figures with unlocked locking pieces;

FIG. 6 shows an enlarged representation of the connection of two members with released locking piece according to FIG. 5;

FIG. 7 shows in a three-dimensional representation the head part according to FIG. 1 in diverted state;

FIG. 8 shows in a three-dimensional sectional representation the head part in the diverted state according to FIG. 7;

FIG. 9 shows an enlarged representation of the connection of two members of the head part according to FIG. 8;

FIG. 12 shows a second embodiment of a head part, in diverted state;

FIG. 13 shows a view of the head part according to FIG. 12 in the stretched position;

FIG. 14 shows a third embodiment of a head part in the diverted state;

FIG. 15 shows a cross-sectional representation of the head part according to FIG. 14;

FIG. 16 shows a view of the head part according to FIG. 14, in the stretched position.

Figure 10:
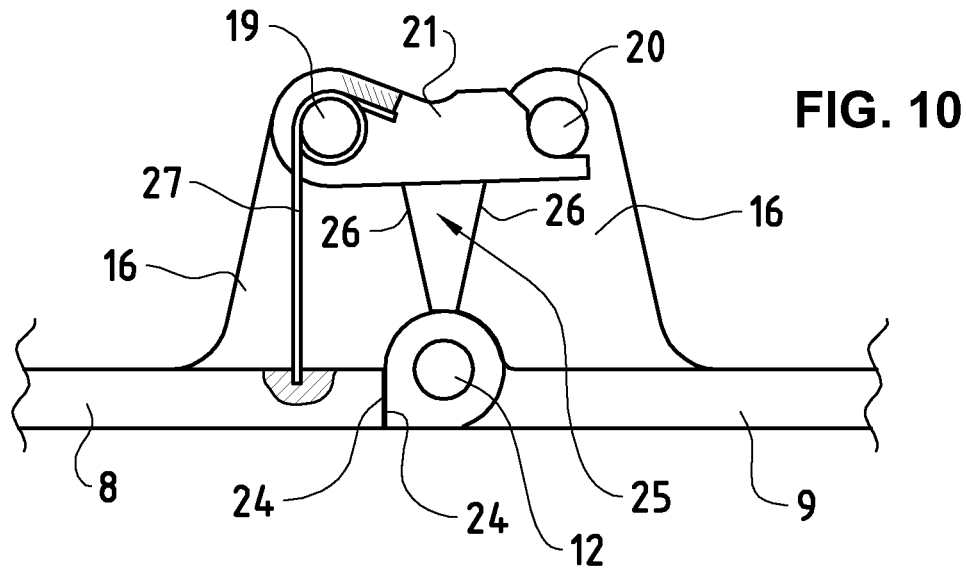
FIG. 10 shows a view of the locking piece of the head part according to FIG. 1.

Shown in FIGS. 1-11 is a first embodiment of the device according to the invention. Seen in FIG. 1 is a three-dimensional representation of a head part 1, which is placed on a longitudinally stable, flexible element 2 that is able to be actuated via a push-in and pull-back device (not shown) in a known way. This longitudinally stable, flexible element 2 is pushable together with the head part 1 into an existing pipe network. After reaching the target station, the cable to be pulled in is attached to this longitudinally stable, flexible element 2. The longitudinally stable, flexible element 2 is pulled back, whereby the cable is pulled into the corresponding pipe region of the pipe network. Cables can already be situated in this pipe region.

The head part 1 is connected to the longitudinally stable, flexible element 2 via a coupling part 3, which will be described later on in detail. The head part 1 comprises a base body 4 having an elongated shape, which base body is connected to the coupling part 3 via a rod arrangement 5, which is likewise flexible. Used in this rod arrangement 5 is a known turning mechanism 6, by means of which the base body 4 is rotatable about the longitudinal axis with respect to the flexible element 2, as will be seen later on.

The base body 4 shown here is made up of a plurality of members 7, 8, 9, 10, which are each pivotable, via an articulation 11, about pivot axes 12, situated parallel to one another. Four members are shown in the embodiment example illustrated here. Of course a lesser or greater number of members could also be used. Attached to member 7, which is connected to the rod arrangement 5 of the head part 1, is a linear drive 13. Installed on this linear drive 13 is the one end of a pulling element 14, whose other end is attached to a holder 15, which, for its part, is fixed to the member 10, which is remote from the flexible element 2. The pulling element 14 extends along the members 7-10, the pulling element being spaced apart from the bending axis of the base body, which axis intersects with the pivot axes 12 between the members 7-10. To guide this pulling element 14, which is designed as a flexible cord, guide elements 15 are installed on the base body 4, which guide elements are designed as projections 16, which are attached to the end regions of the adjacent members in each case. The pulling element 14 is guided by correspondingly configured head regions of these projections 16, as will be described in the following.

Disposed on the member 10, remote from the flexible element 2, of the base body 4 is a light source 17 and a camera 18.

As can be learned from FIGS. 2 and 3, inserted in each case between two projections 16, which are disposed in each case in pairs on the end region of a member 7, 8, 9, 10, is one axial piece each 19 or respectively 20. Disposed in a way pivotable about the one axial piece 19 is a locking piece 21, which is of fork-shaped design. Inserted in the fork-shaped locking piece is a bolt 22, which connects together the two fork parts 23 of the locking piece 21, of which fork parts only one is shown in each case in FIGS. 2 and 3. As can be seen especially in FIG. 3, the end, pivotable about the axial piece 19, of the locking piece 21 is designed latch-like; in the state shown in FIGS. 1-3 the locking piece 21 is thus latched in the axial piece 20. Achieved by this latching is that the members 7, 8, 9, 10 are locked in the stretched position, as is shown in FIGS. 1-3; a pivoting of the individual members about the pivot axis 12 is prevented. The mutually stretched position of the individual members 7-10 is limited in a known way by correspondingly designed stop surfaces, which are formed on the members in the region of the articulations.

As can be seen from FIGS. 2 and 3, the pulling element <14> is led underneath the axial pieces 19 and 20 of the projections 16, while it is conducted between the fork parts 23 of the locking piece 21 above the bolt 22.

Now when this longitudinally stable, flexible element 2, with the head part 1 placed on, is pushed through a piece of pipe running in a straight line, the base body 4 of this head part 1 is situated in the stretched, and via the locking pieces 21 locked, state. The flexible element 2, with the head part 1 placed on, can thereby be pushed forward in an optimal way. The light source 17 illuminates the region of the pipe into which the flexible element with head part is pushed. Via the camera 18 a picture of the interior space of the pipe is conveyed to the operator on his screen.

The supply of electricity to the light source 17 and the camera 18 takes place via cables which are led in a known way (not shown) through the base body 4, through the rod arrangement 5 and the turning mechanism 6 via the coupling part 3 and the longitudinally stable, flexible element 2 back to the operator.

Now when it is conveyed to the operator on the screen by means of the camera that the pipe, into which the flexible element 2, with head part 1 placed on, is being pushed, has a bend (elbow) or a branch, the linear drive 13 can be actuated. By means of this linear drive 13 the pulling element 14 is tensioned, as can be seen from FIGS. 4-6. The tensioning of the pulling element 14 causes the locking piece 21 to be pivoted out of the locked position, as can be seen in particular from FIG. 6. The respective axial piece 20 is released. With further tensioning of the pulling element 14 by the linear drive 13, the individual members 7, 8, 9, 10 are pivoted toward one another, and, to be more precise, about the pivot axis 12 in each case, as is shown in FIGS. 7-9. This pivoting takes place during the further pushing forward of the longitudinally stable, flexible element 2 with the head part 1 into the bent (elbow) region or branching region of the pipe. The pivoted-out base body is led into the bent region (elbow) or respectively the branching-off branch of the pipe. After this insertion has taken place, the pulling element 14 can be released again via the linear drive 1. With further pushing forward, the base body 4, which can assume again the stretched position from the head side, leads the longitudinally stable, flexible element 2, following behind, into the corresponding pipe part. When the base body 4 assumes again the stretched position, the locking pieces 21 end up again in the locked position, as can be seen from FIGS. 1-3. The base body 4 is thus locked again in the stretched position. The further insertion can be continued until the aim of the insertion is achieved or until another elbow or branching is reached, where the procedure described in the foregoing can be repeated.

As can be learned in particular from FIGS. 8 and 9, the pivoted-out position of the base body is limited by stop elements 25. These stop elements 25 are formed by the projections 16 of the members 7-10, every two facing surfaces 26 adjacent to each other of the projections 16 of the members 7-10 coming to abut against each other, as can be seen in particular from FIG. 9, whereby the completely pivoted-out position of the base body is defined.

This completely pivoted-out position of the base body 4 thus describes a curve or bend with which it is ensured that this curved or bent base body 4 can move correctly into the bent (elbow) region or respectively the branched-off pipe region, and in that afterwards the flexible element 2 can follow, without any buckling of any kind taking place.

From FIG. 10 it can be seen that the locking piece is pretensioned via a spring 27 about the axial piece 19 of a projection 16 of one of the members 7-9 in such a way that the locking piece 21 is pressed into the locked position. To release this locking piece from the locked position, as has been previously described, the force of this spring 27 must be overcome. The stop surfaces 24 can likewise be seen from this FIG. 10, which stop surfaces define the stretched position of the members 7-10. In addition, the stop elements 25 are also visible, represented by the facing surfaces 26 of the projections, which define the completely diverted position of the base body 4.

Figure 11:
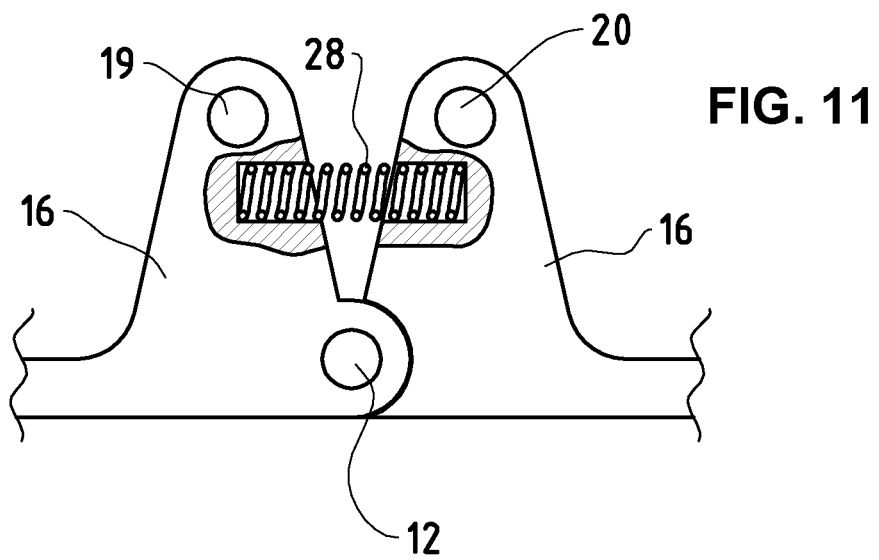
FIG. 11 shows a representation of the spring means, with which the members of the head part according to FIG. 1 are able to be brought into the stretched position.

Seen from FIG. 11 is that a compression spring 28 is inserted between the individual members 7-10 of the base body 4 in the region of the projections 16. With released pulling element 14, this compression spring 28 causes the base body 4 or respectively the individual members 7-10 to be pressed into the completely stretched position, as can be learned from FIGS. 1-3.

As can be learned in particular from FIGS. 4 and 7, the head part 1 is able to be released, via the coupling part 3, from the longitudinally stable, flexible element 2. This coupling part 3 is equipped for this purpose in a known way with a plug device for connection of the cables and a guide, the plug device being located inside the guide in coupled state, and the coupled state being fixable by means of a threaded ring. Coupling devices of this kind are known in various designs.

Through design of the base body 4 and of the pivotable connections of the members 7-10 with the respective pivot axes 12, the base body 4 can be diverted only in one plane, which is perpendicular to the pivot axes 12, and, to be more precise, only on one side. In order to be able to pass through bends (elbows) and branches aligned in all directions, however, the base body 4 can be turned with respect to the longitudinally stable, flexible element 2 in each case by at least ±180° by means of the turning mechanism 6. The head part 1 with the base body 4 can thus be moved in straight direction through a pipe to a bend (elbow) or branching. Via the camera it can be determined in which direction the base body has to be diverted. Before the diversion, the base body can be turned into the correct position by means of the turning mechanism 6 so that the base body can move in the correct direction and into the correct bend (elbow) or branch of the pipe. This turning mechanism 6 is a commercially available, electrically drivable turning mechanism. The cables necessary for supply are also led via the rod arrangement 5, the coupling part 3 and the longitudinally stable, flexible element 2 to the operator.

Also the linear drive 13 is a known, commercially available product, which is able to be actuated, for example, via a spindle drivable by an electro motor.

In addition another device can be used in the base body, which device indicates to the operator in which direction the base body is situated, for instance with respect to gravity. Such a gravitational sensor 37, which is represented schematically in FIGS. 1, 2, 4, 5, 12 and 13, indicates to the operator the alignment of the base body 4 with respect to gravity in the pipe network. Via a corresponding control of the turning mechanism, this gravitational sensor 37 can also be used to keep the base body aligned in the same way with respect to gravity and after passing through bends or branches.

A second embodiment of the device according to the invention is shown in FIGS. 12 and 13. The base body 4 of the head part 1 is composed of a leaf spring 29, which is installed on a member 30 fixed on the rod arrangement 5. Installed on this member 30 is once again a linear drive 13, which corresponds to the previously described linear drive. Held on this linear drive is also a pulling element 14, whose other end is held on the head member 31, which is attached at the other end of the leaf spring 29. This head member 31 is designed in a way corresponding to the member 10 of the previously described embodiment, equipped with light sources and camera. Installed on the leaf spring 29 are guide elements 32, spaced apart from one another, by means of which the pulling element 14 is guided, spaced apart from the leaf spring 29.

In state of rest, i.e. with released pulling element 14 or respectively driven out linear drive 13, the leaf spring 29 assumes the stretched shape, as can be seen from FIG. 13. The stretched position of the leaf spring 29 can be limited via the length of the pulling element 14 and the drive-out position of the linear drive 13. A springing beyond the stretched position is thus impossible. Put on the pulling element 14 are tubular sleeves 33, which have a length such that when the end regions of these tubular sleeves come to abut the guide elements 32, the completely diverted position of the base body 4 is reached. These tubular sleeves 33 thus serve as stop elements.

The leaf spring 29 can be designed such that it has a greater thickness in the region of the member 30 than toward the head member 31, whereby the bending stiffness decreases toward the head member 31 of this leaf spring 29. A better moving into bent (elbow) pipe regions or branches thereof can thereby be achieved. The operation of this second embodiment corresponds to that of the first embodiment. A repeated description can therefore be dispensed with.

A third embodiment of the device according to the invention is shown in FIGS. 14 to 16. Used as base body here is a longitudinal section 34 made up of an elastic material, in which longitudinal section wedge-shaped cavities 35 are provided on one side. The crosspieces 36 left standing serve as guide elements for the pulling element 14, which is guided by corresponding recesses in these crosspieces 36. The pulling element 14 can once again be actuated by a linear drive 13. When pulling on this pulling element, the longitudinal section 34 is diverted in a resilient way, as can be seen from FIG. 14, until the crosspieces 36 lie against one another, and thus serve as stop elements. To increase flexural strength, another leaf spring 37 can be installed in the longitudinal section 34, as can be seen from FIG. 15.

Also here the mode of operation and the mode of handling of this device is the same as has been described with reference to the first embodiment, so that here too a repeated description can be dispensed with.

At least the base body 4 of all three embodiments of the invention previously presented here can of course be provided with a protective cover, consisting, for example, of an elastic tube, whereby all mechanical elements are protected in particular against soiling.

Figure 17:
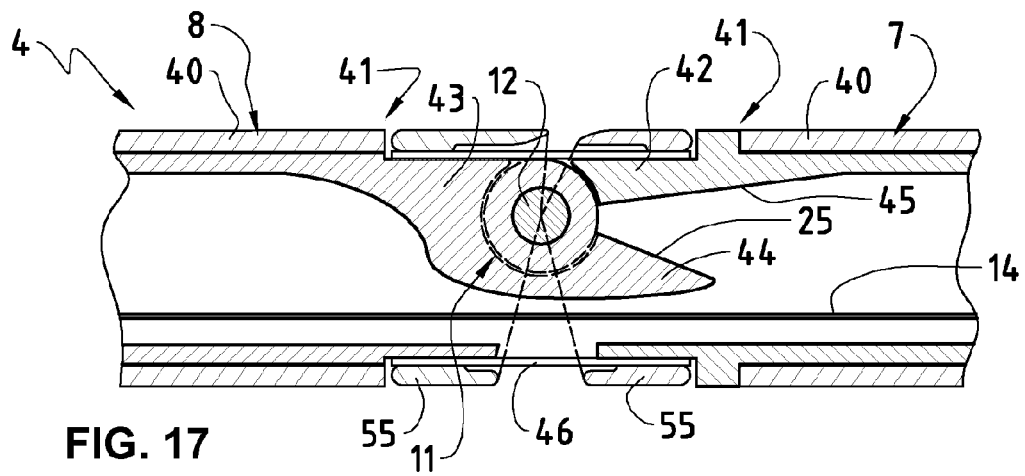
FIG. 17 shows a sectional representation of the connection of two members of a further embodiment of the invention.
Figure 18:
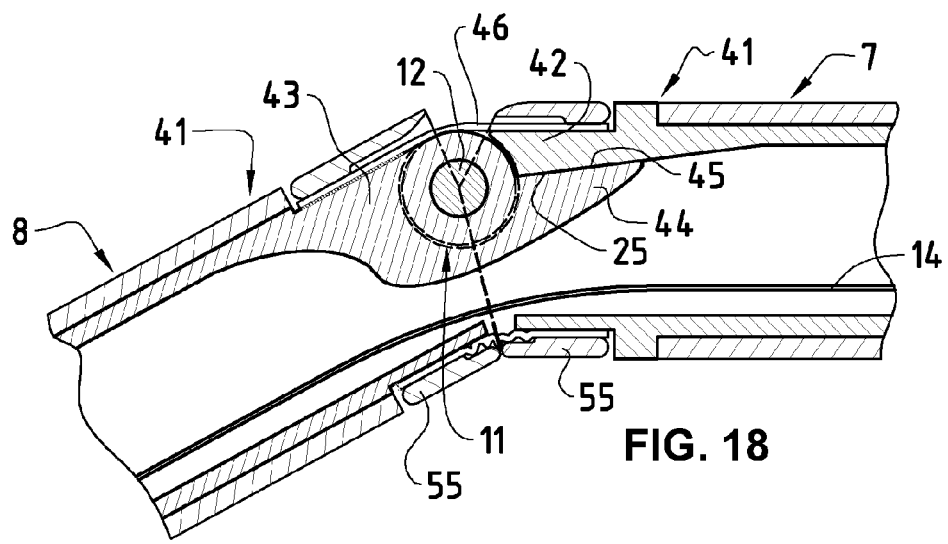
FIG. 18 shows a sectional representation of the connection of two members according to FIG. 17 in the diverted position.
Figure 19:
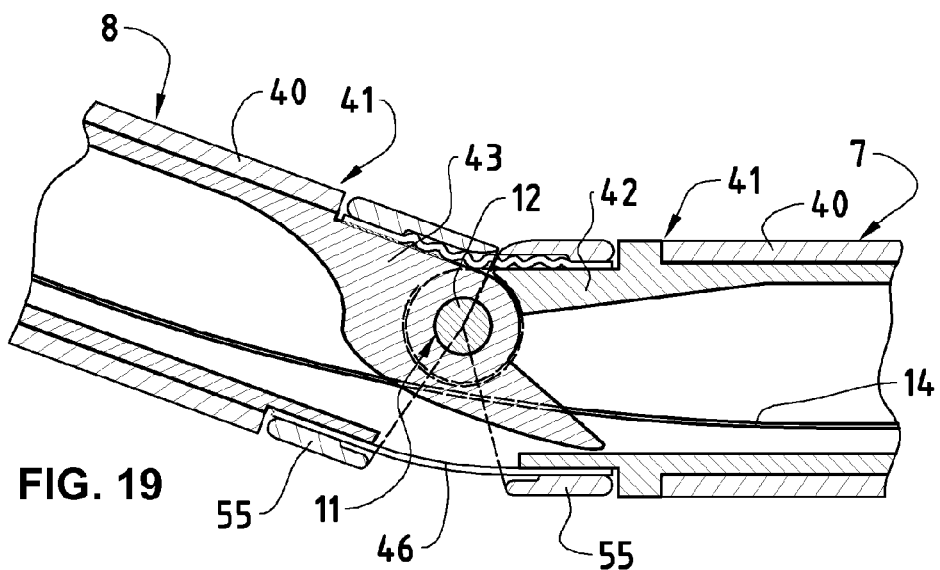
FIG. 19 shows a sectional representation of the connection of the two members according to FIG. 17 in a possible opposite diverted position.

A further embodiment example of the device according to the invention is shown in FIGS. 17 to 19. The base body 4 shown here is once again made up of a plurality of members, of which only the two members 7, 8 are partially visible, which are connected together in a way pivotable about a pivot axis 12 via an articulation 11. The members 7, 8 each comprise a tubular element 40, in each of whose ends 41 a pivoting part 42 or respectively 43 is inserted and fixed, forming the articulation 11. The two pivoting parts 42 and 43 are connected together in a way pivotable about the pivot axis 12. The one pivoting part 42 has a protruding tongue 44, which forms the stop element 25. The other pivoting part 43 is provided with a stop face 45. When actuating the pulling element 14, the two pivoting parts 42 and 43 are diverted, as is shown in FIG. 18, until the stop element 25 comes to abut the stop face 45. The two pivoting parts 42, 43 and with them the members 7 and 8 are thereby situated in the completely diverted position. With this design of the articulation 11, the stress on the stop elements 25 and the stop faces 45 is less.

As can be learned from FIGS. 17 to 19, the regions protruding beyond the tubular elements 40 of the respective members 7, 8 are provided with a protective tube 46 made up of an elastic material. This protective tube 46, for its part, is partially covered with tubular parts 55, through which the protective tube 46, for its part, is protected and which are designed such that a pivot movement of the pivoting parts 42 and 43 about the pivot axis 12 is enabled. Upon pivoting out of the pivoting parts 42, 43, the protective tube is elastically deformed and forms simultaneously the spring element, which presses the members 7, 8 into the stretched position. Of course other known resetting elements can also be employed.

As can be seen from FIG. 19, the articulation 11 between the members 7, 8 is designed in such a way that the members are also able to be diverted about the pivot axis 12 in the opposite direction by a certain amount, when the pulling element 14 is correspondingly released. This is advantageous when the device according to the invention has to compensate for a small bend of the conduit or wire tube.

Figure 20:
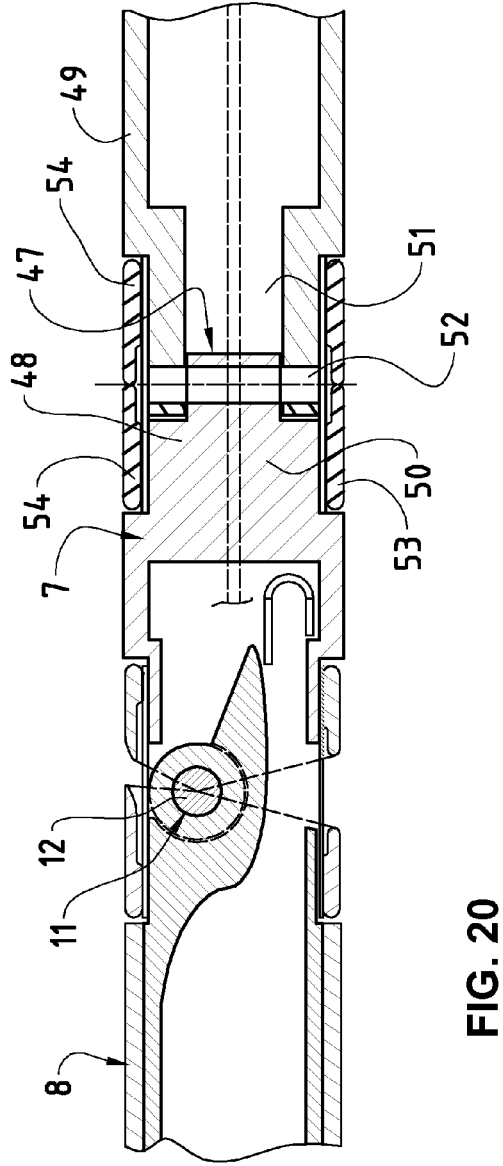
FIG. 20 shows a view of a sectional representation through a further articulation, which is disposed in a member.
Figure 21:
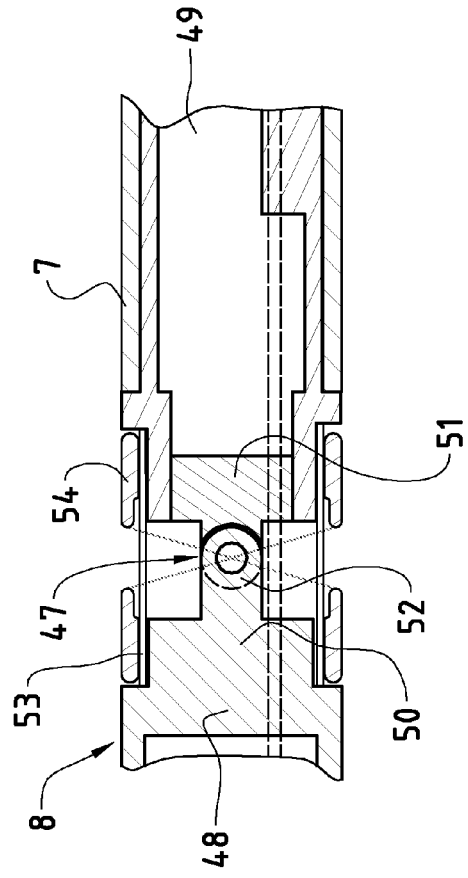
FIG. 21 shows a view from above of a sectional representation through the further articulation according to FIG. 20.

Visible from FIG. 20 and FIG. 21 are the members 7 and 8 of the device according to the invention as shown in FIGS. 17 to 19. These members 7 and 8 are additionally provided with a further articulation 47. To accomplish this, the respective member (in FIGS. 20 and 21 only member 7 is clearly shown) is divided into two parts 48 and 49, which are pivotably connected together via pivoting parts 50 and 51 via the further pivot pin 52. This further pivot axis 52 is aligned transversely to the longitudinal axis of the member 7, and stands perpendicular to the pivot axis 12. The articulation region is once again covered by a protective tube 53, made up of an elastic material, which presses the two parts 48 and 49 into the stretched position. Of course other known spring elements which could fulfill this function would also be conceivable. This protective tube 53 is once again covered with tubular parts 54, by means of which the protective tube 53, for its part, is protected, and which are designed in such a way that a pivot movement of the two parts 48 and 49 about the further pivot axis 52 is enabled. Made possible with this further articulation is that, by means of corresponding adaptations through deviation, the device according to the invention can compensate for slight bends or warps in the conduit or wire tube, which can lie in another plane than the main bend of the conduit or wire tube to be passed through in a controlled way, which improves the performance of devices of this kind according to the invention.

With this invention, an insertion device for cable is made available with which it is possible, in existing pipe networks, to insert a longitudinally stable, flexible element with placed-on head part, whereby bends (elbows) and branches in this pipe network can be negotiated in the desired way. After the final destination has been reached, the head part can be decoupled in an easy way from the longitudinally stable, flexible element. In a corresponding way, the cable to be inserted can be coupled to this longitudinally stable, flexible element. The longitudinally stable, flexible element is then pulled back, whereby the cable is pulled in the desired way into the existing pipe network.

The invention claimed is:

1. An insertion device for a cable in an existing pipe network, comprising:
    a longitudinally stable flexible element, configured to be inserted into a pipe region of the pipe network;
    a head part configured to be placed on the flexible element, which head part is configured to be diverted for passing through areas of bends of the pipe;
    a coupling part configured to be placed on the flexible element and to which the cable to be pulled in is configured to be coupled, wherein the head part comprises a base body having an elongated shape, which base body is configured to be led from a stretched position into a bent position, which base body includes guide elements, by which at least one pulling element is guided, which is spaced apart from the bending axis of the base body, which at least one pulling element is held by the one end on an end region of the base body and by the other end on a drivable linear drive disposed on the other end region of the base body, and further comprising a light source and a camera disposed on the end region, remote from the flexible element of the head part; and
    a gravitational sensor disposed in the base body, with which the position of the base body with respect to gravity can be determined.

2. An insertion device for a cable in an existing pipe network according to claim 1, wherein the divertable base body is configured to be diverted in a plane, and further comprising a turning mechanism disposed between the head part and the longitudinally stable flexible element.

3. An insertion device for a cable in an existing pipe network according to claim 1, wherein the divertable base body includes spring means, by which the divertable base body is pushable into the stretched position.

4. An insertion device for a cable in an existing pipe network according to claim 2, further comprising one pulling element whereby the base body is divertable out of the stretched position on one side only, and wherein the head part is turnable by the turning mechanism by at least ±180°.

5. An insertion device for a cable in an existing pipe network according to claim 1, wherein the completely diverted position of the divertable base body is limited by stop elements.

6. An insertion device for a cable in an existing pipe network according to claim 2, wherein the base body includes individual members connected together in an articulated way.

7. An insertion device for a cable in an existing pipe network according to claim 6, wherein the individual members each include an articulation disposed such that the individual members are configured to be diverted transversely to the plane.

8. An insertion device for a cable in an existing pipe network according to claim 7, wherein the articulation includes an elastic element that pushes the articulation into a stretched position.

9. An insertion device for a cable in an existing pipe network according to claim 6, wherein the guide elements include projections provided on both end regions of the respective element, and wherein facing surfaces directed toward the projections of the adjacent member form the stop elements.

10. An insertion device for a cable in an existing pipe network according to claim 6, wherein the individual members forming the base body are blockable in a stretched position by locking pieces, which are pushable via a spring force into a locking position.

11. An insertion device for a cable in an existing pipe network according to claim 10, wherein each locking piece includes a bolt situated transversely to the pulling element, about which bolts the pulling element is guided, and which bolts are disposed such that upon pulling on the pulling element and reaching a stretched position of the pulling element, the locking pieces are released, and upon further pulling on the pulling element the individual members divert.

12. An insertion device for a cable in an existing pipe network according to claim 2, wherein the base body includes a leaf spring, on which the guide elements are installed in a way spaced apart from one another.

13. An insertion device for a cable in an existing pipe network according to claim 12, wherein tubular sleeves are put on the pulling element between the guide elements, which sleeves serve as stop elements.

14. An insertion device for a cable in an existing pipe network according to claim 2, wherein the base body includes a longitudinal section including an elastic material, in which wedge-shaped cavities are installed on one side, and crosspieces left standing serve as guide elements for the pulling element and as stop elements.

15. An insertion device for a cable in an existing pipe network according to claim 2, wherein the linear drive and the turning mechanism are driven electrically, and wherein their supply cables and the cables for the light source and the camera are led through the head part and the longitudinally stable flexible element.

16. An insertion device for a cable in an existing pipe network according to claim 2, wherein the head part with the turning mechanism is connectible to the longitudinally stable flexible element via a releasable coupling connection and plug connection.

17. An insertion device for a cable in an existing pipe network, comprising:
    a longitudinally stable flexible element, configured to be inserted into a pipe region of the pipe network;
    a head part configured to be placed on the flexible element, which head part is configured to be diverted for passing through areas of bends of the pipe;
    a coupling part configured to be placed on the flexible element and to which the cable to be pulled in is configured to be coupled, wherein the head part comprises a base body having an elongated shape, which base body is configured to be led from a stretched position into a bent position, which base body includes guide elements, by which at least one pulling element is guided, which is spaced apart from the bending axis of the base body, which at least one pulling element is held by the one end on an end region of the base body and by the other end on a drivable linear drive disposed on the other end region of the base body, and further comprising a light source and a camera disposed on the end region, remote from the flexible element of the head part; and wherein the divertable base body includes spring means, by which the divertable base body is pushable into the stretched position.

18. An insertion device for a cable in an existing pipe network according to claim 17, wherein the divertable base body is configured to be diverted in a plane, and further comprising a turning mechanism disposed between the head part and the longitudinally stable flexible element further comprising one pulling element whereby the base body is divertable out of the stretched position on one side only, and wherein the head part is turnable by the turning mechanism-by at least ±180°.

19. An insertion device for a cable in an existing pipe network according to claim 17, wherein the completely diverted position of the divertable base body is limited by stop elements.

20. An insertion device for a cable in an existing pipe network according to claim 2, wherein the base body includes individual members connected together in an articulated way.

21. An insertion device for a cable in an existing pipe network according to claim 20, wherein the individual members each include an articulation disposed such that the individual members are configured to be diverted transversely to the plane.

22. An insertion device for a cable in an existing pipe network according to claim 21, wherein the articulation includes an elastic element that pushes the articulation into a stretched position.

23. An insertion device for a cable in an existing pipe network according to claim 20, wherein the guide elements include projections provided on both end regions of the respective element, and wherein facing surfaces directed toward the projections of the adjacent member form the stop elements.

24. An insertion device for a cable in an existing pipe network according to claim 20, wherein the individual members forming the base body are blockable in a stretched position by locking pieces, which are pushable via a spring force into a locking position.

25. An insertion device for a cable in an existing pipe network according to claim 24, wherein each locking piece includes a bolt situated transversely to the pulling element, about which bolts the pulling element is guided, and which bolts are disposed such that upon pulling on the pulling element and reaching a stretched position of the pulling element, the locking pieces are released, and upon further pulling on the pulling element the individual members divert.

26. An insertion device for a cable in an existing pipe network according to claim 18, wherein the base body includes a leaf spring, on which the guide elements are installed in a way spaced apart from one another.

27. An insertion device for a cable in an existing pipe network according to claim 26, wherein tubular sleeves are put on the pulling element between the guide elements, which sleeves serve as stop elements.

28. An insertion device for a cable in an existing pipe network according to claim 18, wherein the base body includes a longitudinal section including an elastic material, in which wedge-shaped cavities are installed on one side, and crosspieces left standing serve as guide elements for the pulling element and as stop elements.

29. An insertion device for a cable in an existing pipe network according to claim 18, wherein the linear drive and the turning mechanism are driven electrically, and wherein their supply cables and the cables for the light source and the camera are led through the head part and the longitudinally stable flexible element.

30. An insertion device for a cable in an existing pipe network according to claim 18, wherein the head part with the turning mechanism is connectible to the longitudinally stable flexible element via a releasable coupling connection and plug connection.

31. An insertion device for a cable in an existing pipe network according to claim 17, further comprising a gravitational sensor disposed in the base body, with which the position of the base body with respect to gravity can be determined.

32. An insertion device for a cable in an existing pipe network, comprising:
a longitudinally stable flexible element, configured to be inserted into a pipe region of the pipe network;
a head part configured to be placed on the flexible element, which head part is configured to be diverted for passing through areas of bends of the pipe;
a coupling part configured to be placed on the flexible element and to which the cable to be pulled in is configured to be coupled, wherein the head part comprises a base body having an elongated shape, which base body is configured to be led from a stretched position into a bent position, which base body includes guide elements, by which at least one pulling element is guided, which is spaced apart from the bending axis of the base body, which at least one pulling element is held by the one end on an end region of the base body and by the other end on a drivable linear drive disposed on the other end region of the base body, and further comprising a light source and a camera disposed on the end region, remote from the flexible element of the head part;
wherein the divertable base body is configured to be diverted in a plane, and further comprising a turning mechanism disposed between the head part and the longitudinally stable flexible element; and
wherein the at least one pulling element enables the base body to be divertable out of the stretched position on one side only, and wherein the head part is turnable by the turning mechanism-by at least ±180°.

33. An insertion device for a cable in an existing pipe network according to claim 32, wherein the completely diverted position of the divertable base body is limited by stop elements.

34. An insertion device for a cable in an existing pipe network according to claim 4, wherein the base body includes individual members connected together in an articulated way.

35. An insertion device for a cable in an existing pipe network according to claim 34, wherein the individual members each include an articulation disposed such that the individual members are configured to be diverted transversely to the plane.

36. An insertion device for a cable in an existing pipe network according to claim 35, wherein the articulation includes an elastic element that pushes the articulation into a stretched position.

37. An insertion device for a cable in an existing pipe network according to claim 34, wherein the guide elements include projections provided on both end regions of the respective element, and wherein facing surfaces directed toward the projections of the adjacent member form the stop elements.

38. An insertion device for a cable in an existing pipe network according to claim 34, wherein the individual members forming the base body are blockable in a stretched position by locking pieces, which are pushable via a spring force into a locking position.

39. An insertion device for a cable in an existing pipe network according to claim 38, wherein each locking piece includes a bolt situated transversely to the pulling element, about which bolts the pulling element is guided, and which bolts are disposed such that upon pulling on the pulling element and reaching a stretched position of the pulling element, the locking pieces are released, and upon further pulling on the pulling element the individual members divert.

40. An insertion device for a cable in an existing pipe network according to claim 32, wherein the base body includes a leaf spring, on which the guide elements are installed in a way spaced apart from one another.

41. An insertion device for a cable in an existing pipe network according to claim 40, wherein tubular sleeves are put on the pulling element between the guide elements, which sleeves serve as stop elements.

42. An insertion device for a cable in an existing pipe network according to claim 32, wherein the base body includes a longitudinal section including an elastic material, in which wedge-shaped cavities are installed on one side, and crosspieces left standing serve as guide elements for the pulling element and as stop elements.

43. An insertion device for a cable in an existing pipe network according to claim 32, wherein the linear drive and the turning mechanism are driven electrically, and wherein their supply cables and the cables for the light source and the camera are led through the head part and the longitudinally stable flexible element.

44. An insertion device for a cable in an existing pipe network according to claim 32, wherein the head part with the turning mechanism is connectible to the longitudinally stable flexible element via a releasable coupling connection and plug connection.

45. An insertion device for a cable in an existing pipe network according to claim 32, further comprising a gravitational sensor disposed in the base body, with which the position of the base body with respect to gravity can be determined.

46. An insertion device for a cable in an existing pipe network, comprising:
a longitudinally stable flexible element, configured to be inserted into a pipe region of the pipe network;
a head part configured to be placed on the flexible element, which head part is configured to be diverted for passing through areas of bends of the pipe;
a coupling part configured to be placed on the flexible element and to which the cable to be pulled in is configured to be coupled, wherein the head part comprises a base body having an elongated shape, which base body is configured to be led from a stretched position into a bent position, which base body includes guide elements, by which at least one pulling element is guided, which is spaced apart from the bending axis of the base body, which at least one pulling element is held by the one end on an end region of the base body and by the other end on a drivable linear drive disposed on the other end region of the base body, and further comprising a light source and a camera disposed on the end region, remote from the flexible element of the head part;
wherein the divertable base body is configured to be diverted in a plane, and further comprising a turning mechanism disposed between the head part and the longitudinally stable flexible element;
wherein the base body includes individual members connected together in an articulated way;
wherein the individual members each include an articulation disposed such that the individual members are configured to be diverted transversely to the plane; and
wherein the articulation includes an elastic element that pushes the articulation into a stretched position.

47. An insertion device for a cable in an existing pipe network according to claim 46, wherein the guide elements include projections provided on both end regions of the respective element, and wherein facing surfaces directed toward the projections of the adjacent member form the stop elements.

48. An insertion device for a cable in an existing pipe network according to claim 46, wherein the individual members forming the base body are blockable in a stretched position by locking pieces, which are pushable via a spring force into a locking position.

49. An insertion device for a cable in an existing pipe network according to claim 48, wherein each locking piece includes a bolt situated transversely to the pulling element, about which bolts the pulling element is guided, and which bolts are disposed such that upon pulling on the pulling element and reaching a stretched position of the pulling element, the locking pieces are released, and upon further pulling on the pulling element the individual members divert.

50. An insertion device for a cable in an existing pipe network according to claim 46, wherein the base body includes a leaf spring, on which the guide elements are installed in a way spaced apart from one another.

51. An insertion device for a cable in an existing pipe network according to claim 50, wherein tubular sleeves are put on the pulling element between the guide elements, which sleeves serve as stop elements.

52. An insertion device for a cable in an existing pipe network according to claim 46, wherein the base body includes a longitudinal section including an elastic material, in which wedge-shaped cavities are installed on one side, and crosspieces left standing serve as guide elements for the pulling element and as stop elements.

53. An insertion device for a cable in an existing pipe network according to claim 46, wherein the linear drive and the turning mechanism are driven electrically, and wherein their supply cables and the cables for the light source and the camera are led through the head part and the longitudinally stable flexible element.

54. An insertion device for a cable in an existing pipe network according to claim 46, wherein the head part with the turning mechanism is connectible to the longitudinally stable flexible element via a releasable coupling connection and plug connection.

55. An insertion device for a cable in an existing pipe network according to claim 46, further comprising a gravitational sensor disposed in the base body, with which the position of the base body with respect to gravity can be determined.

56. An insertion device for a cable in an existing pipe network, comprising:
a longitudinally stable flexible element, configured to be inserted into a pipe region of the pipe network;

a head part configured to be placed on the flexible element, which head part is configured to be diverted for passing through areas of bends of the pipe;

a coupling part configured to be placed on the flexible element and to which the cable to be pulled in is configured to be coupled, wherein the head part comprises a base body having an elongated shape, which base body is configured to be led from a stretched position into a bent position, which base body includes guide elements, by which at least one pulling element is guided, which is spaced apart from the bending axis of the base body, which at least one pulling element is held by the one end on an end region of the base body and by the other end on a drivable linear drive disposed on the other end region of the base body, and further comprising a light source and a camera disposed on the end region, remote from the flexible element of the head part;

wherein the divertable base body is configured to be diverted in a plane, and further comprising a turning mechanism disposed between the head part and the longitudinally stable flexible element;

wherein the base body includes individual members connected together in an articulated way; and wherein the guide elements include projections provided on both end regions of the respective element, and wherein facing surfaces directed toward the projections of the adjacent member form the stop elements.

57. An insertion device for a cable in an existing pipe network according to claim 56, wherein the individual members forming the base body are blockable in a stretched position by locking pieces, which are pushable via a spring force into a locking position.

58. An insertion device for a cable in an existing pipe network according to claim 57, wherein each locking piece includes a bolt situated transversely to the pulling element, about which bolts the pulling element is guided, and which bolts are disposed such that upon pulling on the pulling element and reaching a stretched position of the pulling element, the locking pieces are released, and upon further pulling on the pulling element the individual members divert.

59. An insertion device for a cable in an existing pipe network according to claim 56, wherein the base body includes a leaf spring, on which the guide elements are installed in a way spaced apart from one another.

60. An insertion device for a cable in an existing pipe network according to claim 59, wherein tubular sleeves are put on the pulling element between the guide elements, which sleeves serve as stop elements.

61. An insertion device for a cable in an existing pipe network according to claim 56, wherein the base body includes a longitudinal section including an elastic material, in which wedge-shaped cavities are installed on one side, and crosspieces left standing serve as guide elements for the pulling element and as stop elements.

62. An insertion device for a cable in an existing pipe network according to claim 56, wherein the linear drive and the turning mechanism are driven electrically, and wherein their supply cables and the cables for the light source and the camera are led through the head part and the longitudinally stable flexible element.

63. An insertion device for a cable in an existing pipe network according to claim 56, wherein the head part with the turning mechanism is connectible to the longitudinally stable flexible element via a releasable coupling connection and plug connection.

64. An insertion device for a cable in an existing pipe network according to claim 56, further comprising a gravitational sensor disposed in the base body, with which the position of the base body with respect to gravity can be determined.

65. An insertion device for a cable in an existing pipe network, comprising:

a longitudinally stable flexible element, configured to be inserted into a pipe region of the pipe network;

a head part configured to be placed on the flexible element, which head part is configured to be diverted for passing through areas of bends of the pipe;

a coupling part configured to be placed on the flexible element and to which the cable to be pulled in is configured to be coupled, wherein the head part comprises a base body having an elongated shape, which base body is configured to be led from a stretched position into a bent position, which base body includes guide elements, by which at least one pulling element is guided, which is spaced apart from the bending axis of the base body, which at least one pulling element is held by the one end on an end region of the base body and by the other end on a drivable linear drive disposed on the other end region of the base body, and further comprising a light source and a camera disposed on the end region, remote from the flexible element of the head part;

wherein the divertable base body is configured to be diverted in a plane, and further comprising a turning mechanism disposed between the head part and the longitudinally stable flexible element;

wherein the base body includes individual members connected together in an articulated way; and wherein the individual members forming the base body are blockable in a stretched position by locking pieces, which are pushable via a spring force into a locking position.

66. An insertion device for a cable in an existing pipe network according to claim 65, wherein each locking piece includes a bolt situated transversely to the pulling element, about which bolts the pulling element is guided, and which bolts are disposed such that upon pulling on the pulling element and reaching a stretched position of the pulling element, the locking pieces are released, and upon further pulling on the pulling element the individual members divert.

67. An insertion device for a cable in an existing pipe network according to claim 65, wherein the base body includes a leaf spring, on which the guide elements are installed in a way spaced apart from one another.

68. An insertion device for a cable in an existing pipe network according to claim 67, wherein tubular sleeves are put on the pulling element between the guide elements, which sleeves serve as stop elements.

69. An insertion device for a cable in an existing pipe network according to claim 65, wherein the base body includes a longitudinal section including an elastic material, in which wedge-shaped cavities are installed on one side, and crosspieces left standing serve as guide elements for the pulling element and as stop elements.

70. An insertion device for a cable in an existing pipe network according to claim 65, wherein the linear drive and the turning mechanism are driven electrically, and wherein their supply cables and the cables for the light source and the camera are led through the head part and the longitudinally stable flexible element.

71. An insertion device for a cable in an existing pipe network according to claim 65, wherein the head part with the turning mechanism is connectible to the longitudinally stable flexible element via a releasable coupling connection and plug connection.

72. An insertion device for a cable in an existing pipe network according to claim 65, further comprising a gravitational sensor disposed in the base body, with which the position of the base body with respect to gravity can be determined.

73. An insertion device for a cable in an existing pipe network, comprising:
- a longitudinally stable flexible element, configured to be inserted into a pipe region of the pipe network;
- a head part configured to be placed on the flexible element, which head part is configured to be diverted for passing through areas of bends of the pipe;
- a coupling part configured to be placed on the flexible element and to which the cable to be pulled in is configured to be coupled, wherein the head part comprises a base body having an elongated shape, which base body is configured to be led from a stretched position into a bent position, which base body includes guide elements, by which at least one pulling element is guided, which is spaced apart from the bending axis of the base body, which at least one pulling element is held by the one end on an end region of the base body and by the other end on a drivable linear drive disposed on the other end region of the base body, and further comprising a light source and a camera disposed on the end region, remote from the flexible element of the head part;
- wherein the divertable base body is configured to be diverted in a plane, and further comprising a turning mechanism disposed between the head part and the longitudinally stable flexible element; and
- wherein the base body includes a leaf spring, on which the guide elements are installed in a way spaced apart from one another.

74. An insertion device for a cable in an existing pipe network according to claim 73, wherein tubular sleeves are put on the pulling element between the guide elements, which sleeves serve as stop elements.

75. An insertion device for a cable in an existing pipe network according to claim 73, wherein the base body includes a longitudinal section including an elastic material, in which wedge-shaped cavities are installed on one side, and crosspieces left standing serve as guide elements for the pulling element and as stop elements.

76. An insertion device for a cable in an existing pipe network according to claim 73, wherein the linear drive and the turning mechanism are driven electrically, and wherein their supply cables and the cables for the light source and the camera are led through the head part and the longitudinally stable flexible element.

77. An insertion device for a cable in an existing pipe network according to claim 73, wherein the head part with the turning mechanism is connectible to the longitudinally stable flexible element via a releasable coupling connection and plug connection.

78. An insertion device for a cable in an existing pipe network according to claim 73, further comprising a gravitational sensor disposed in the base body, with which the position of the base body with respect to gravity can be determined.

79. An insertion device for a cable in an existing pipe network, comprising:
- a longitudinally stable flexible element, configured to be inserted into a pipe region of the pipe network;
- a head part configured to be placed on the flexible element, which head part is configured to be diverted for passing through areas of bends of the pipe;
- a coupling part configured to be placed on the flexible element and to which the cable to be pulled in is configured to be coupled, wherein the head part comprises a base body having an elongated shape, which base body is configured to be led from a stretched position into a bent position, which base body includes guide elements, by which at least one pulling element is guided, which is spaced apart from the bending axis of the base body, which at least one pulling element is held by the one end on an end region of the base body and by the other end on a drivable linear drive disposed on the other end region of the base body, and further comprising a light source and a camera disposed on the end region, remote from the flexible element of the head part;
- wherein the divertable base body is configured to be diverted in a plane, and further comprising a turning mechanism disposed between the head part and the longitudinally stable flexible element; and
- wherein the base body includes a longitudinal section including an elastic material, in which wedge-shaped cavities are installed on one side, and crosspieces left standing serve as guide elements for the pulling element and as stop elements.

80. An insertion device for a cable in an existing pipe network according to claim 79, wherein the linear drive and the turning mechanism are driven electrically, and wherein their supply cables and the cables for the light source and the camera are led through the head part and the longitudinally stable flexible element.

81. An insertion device for a cable in an existing pipe network according to claim 79, wherein the head part with the turning mechanism is connectible to the longitudinally stable flexible element via a releasable coupling connection and plug connection.

82. An insertion device for a cable in an existing pipe network according to claim 79, further comprising a gravitational sensor disposed in the base body, with which the position of the base body with respect to gravity can be determined.

83. An insertion device for a cable in an existing pipe network, comprising:
- a longitudinally stable flexible element, configured to be inserted into a pipe region of the pipe network;
- a head part configured to be placed on the flexible element, which head part is configured to be diverted for passing through areas of bends of the pipe;
- a coupling part configured to be placed on the flexible element and to which the cable to be pulled in is configured to be coupled, wherein the head part comprises a base body having an elongated shape, which base body is configured to be led from a stretched position into a bent position, which base body includes guide elements, by which at least one pulling element is guided, which is spaced apart from the bending axis of the base body, which at least one pulling element is held by the one end on an end region of the base body and by the other end on a drivable linear drive disposed on the other end region of the base body, and further comprising a light source and a camera disposed on the end region, remote from the flexible element of the head part;
- wherein the divertable base body is configured to be diverted in a plane, and further comprising a turning mechanism disposed between the head part and the longitudinally stable flexible element; and
- wherein the linear drive and the turning mechanism are driven electrically, and wherein their supply cables and the cables for the light source and the camera are led through the head part and the longitudinally stable flexible element.

84. An insertion device for a cable in an existing pipe network according to claim 83, wherein the head part with the turning mechanism is connectible to the longitudinally stable flexible element via a releasable coupling connection and plug connection.

85. An insertion device for a cable in an existing pipe network according to claim 83, further comprising a gravitational sensor disposed in the base body, with which the position of the base body with respect to gravity can be determined.

86. An insertion device for a cable in an existing pipe network, comprising:
- a longitudinally stable flexible element, configured to be inserted into a pipe region of the pipe network;
- a head part configured to be placed on the flexible element, which head part is configured to be diverted for passing through areas of bends of the pipe;
- a coupling part configured to be placed on the flexible element and to which the cable to be pulled in is configured to be coupled, wherein the head part comprises a base body having an elongated shape, which base body is configured to be led from a stretched position into a bent position, which base body includes guide elements, by which at least one pulling element is guided, which is spaced apart from the bending axis of the base body, which at least one pulling element is held by the one end on an end region of the base body and by the other end on a drivable linear drive disposed on the other end region of the base body, and further comprising a light source and a camera disposed on the end region, remote from the flexible element of the head part;
- wherein the divertable base body is configured to be diverted in a plane, and further comprising a turning mechanism disposed between the head part and the longitudinally stable flexible element; and
- wherein the head part with the turning mechanism is connectible to the longitudinally stable flexible element via a releasable coupling connection and plug connection.

87. An insertion device for a cable in an existing pipe network according to claim 86, further comprising a gravitational sensor disposed in the base body, with which the position of the base body with respect to gravity can be determined.

\* \* \* \* \*